United States Patent [19]
Percec

[11] Patent Number: 5,091,480
[45] Date of Patent: Feb. 25, 1992

[54] COMB-LIKE POLYMERS AND GRAFT COPOLYMERS FROM POLYARYLENE POLYETHER MACROMONOMERS

[75] Inventor: Virgil Percec, Pepper Pike, Ohio

[73] Assignee: The B. F. Goodrich Company, Akron, Ohio

[21] Appl. No.: 351,363

[22] Filed: May 12, 1989

Related U.S. Application Data

[63] Continuation-in-part of Ser. No. 932,4832, Nov. 18, 1986, abandoned, which is a continuation-in-part of Ser. No. 586,679, Mar. 6, 1984, abandoned.

[51] Int. Cl.$^5$ .................. C08F 283/08; C08G 75/23; C08L 71/12
[52] U.S. Cl. ...................... 525/391; 525/471; 525/535; 525/905; 525/906
[58] Field of Search ............ 525/391, 905, 906, 471, 525/535

[56] References Cited

U.S. PATENT DOCUMENTS

| | | | |
|---|---|---|---|
| 4,207,406 | 6/1980 | Orlander | 525/391 |
| 4,634,742 | 6/1987 | Percec | 525/390 |
| 4,663,402 | 5/1987 | Percec et al. | 525/534 |
| 4,701,514 | 10/1987 | Percec | 528/174 |

FOREIGN PATENT DOCUMENTS 55-036210  3/1980  Japan .................. 525/906

*Primary Examiner*—Jacob Ziegler
*Attorney, Agent, or Firm*—Alfred D. Lobo

[57] ABSTRACT

Oligomers of polyarylene polyethethers (PAPE) having a mol wt $\overline{M}n$ in the range from 1000 to about 10,000 are converted to monofunctionalized macromers, so as, in the first instance, to provide a reactive double bond (for example, a vinylbenzyl group) at only one end of the PAPE; and, in the second instance, to provide a triple bond (benzylethynyl group) at only one end of the PAPE. The macromer may be a polysulfone, a polyketone, or a copolymer containing both sulfone and ketone-containing units; or, the macromer may be monofunctionalized PPO. The synthesis of macromers with terminal double bonds is carried out with a fast and quantitative modified Williamson etherification of the PAPE with an electrophilic haloalkyl reactant ("HAR") such as chloromethylstyrene ("ClMS") in the presence of a major molar amount (more than 50 mol % based on the number of moles of OH group originally present in the oligomer) of a phase transfer catalyst such as tetrabutylammonium hydrogen sulfate ("TBAH"). The vinyl groups at the end of the marcomer may then be converted to an ethynyl group by bromination of the macromer in $CH_2Cl_2$ or $CHCl_3$, followed by dehydrobromination in the presence of potassium-tert-butoxide ("K-t-Bu"). The glass transition temperature ($T_g$) of the comb-like polymer produced from (monostyrenated) macromer after curing, is unexpectedly higher than that of the terminally halogenated macromer which the comb-like polymer is derived.

4 Claims, No Drawings

COMB-LIKE POLYMERS AND GRAFT COPOLYMERS FROM POLYARYLENE POLYETHER MACROMONOMERS

CROSS-REFERENCE TO RELATED APPLICATION

This application is a continuation-in-part of Ser. No. 932,483 filed Nov. 18, 1986 which in turn is a continuation-in-part of Ser. No. 586,679 filed Mar. 6, 1984, both applications now abandoned.

BACKGROUND OF THE INVENTION

The elegant demonstration by Milkovich et al that graft and multi-branched copolymers can be prepared by the copolymerization of macromonomers (hereafter "macromers" for brevity), with conventional small monomers has initiated a spate of publications in this field. Particular interest has been focussed upon the radical polymerizations of vinyl monomers because it was expected that the rate of polymerization and the degree of polymerization on the molecular weight ($\overline{M}n$) of the growing polymer may be substantially the same as that of conventional vinyl monomers. Both the rate and the degree of polymerization are generally quite high for vinyl monomers which are therefore of major economic interest. The realization that a large moiety adjacent the vinyl head group often reduces the rate of polymerization of the macromer because of the relatively low concentration of reactive end groups, particularly at high conversions where also the increased viscosity of the reaction mass reduces the diffusion of the macromer to the reaction site, has done nothing to dull this interest.

The particular interest of this invention is to prepare graft copolymers containing high glass transition temperature ($T_g$) grafts, having a $T_g$ above 100° C., such graft copolymers being heretofore unknown. Though all the polymers ('polymacromers') prepared herein are graft copolymers, the term "comb-like" or "comb" is used to refer to those in which a graft (or 'tine') is present at regular intervals spaced by a single repeating unit in the backbone of the comb. More particularly, the polymacromers of this invention are derived from a polymerizable polyarylene polyether macromer, referred to herein as a PAPE (for brevity) macromer.

A PAPE macromer typically has a diphenyl sulfone, dinaphtyl sulfone, diphenyl ketone, dinaphtyl sulfone, diphenyl ketone, or, 2,6-dimethyl phenylene repeating unit.

A typical PAPE macromer has a $\overline{M}n$ in the range from about 1000 to about 10,000, and because of this relatively low mol wt are referred to herein as OH-terminated oligomers. They are typically terminated at the other chain end with a halogen (Hal) atom, though such Hal termination is not essential for the functionalization of the oligomers' OH group. It is the OH-group which I have functionalized to contain a single vinyl group, hence the macromers formed are said to be vinyl-functionalized. These macromers may be thermally or otherwise polymerized to form comb-like polymers by homopolymerization of a vinyl-functionalized macromer; and graft copolymers by copolymerization of two or more vinyl-functionalized macromers. All the graft homopolymers and copolymers are thermally stable at a temperature above 100° C.

Most commonly, an anionic living polymer is reacted with electrophiles containing unsaturated functions. For example, polystyrene, polyisoprene, or styreneisoprene diblock macromers have been terminated with various polyfunctional groups such as alpha-olefin, vinyl alkyl ether, styryl, acrylate, methacrylate, maleic half ester, or epoxy. Macromers have also been synthesized by Tsuruta by a poly-addition reaction of divinyl compounds (Makromol. Chem. 183 29-45, 1981), and by Hudecek by transformation of reactive polymer end groups (Polym. Bull. 3 143, 1980).

Cationic techniques have also been used for preparing macromers by Kennedy et al (1980) who prepared a polyisobutylene macromer, and by Sierra-Vargas (1980) who prepared a polytetrahydrofuran macromer.

Of more particular interest is that it is known that it is possible to use a wide variety of macromers with one polymerizable vinyl head group, each of which macromers may be tailored in $\overline{M}n$ and structural configuration to provide polymers with a wide spectrum of physical properties. Typical of such macromers are those with styryl and acrylate head groups disclosed by Kennedy, J. P. et al in I.U.P.A.C. Intl. Symp. on Macromolecules, Florence, Preprints, p 162 (1980); Polym. Prepr. Am. Chem. Soc. Div. Polym. Chem., 23, No. 2, 99 (1982); Polym. Bull., 6, 135 (1981); inter alia.

The use of a direct reaction of a polysulfone oligomer having a terminal phenyl group, in solution (referred to as an "in solution reaction"), has been found appropriate to provide the macromer with a single terminal vinyl group which group is a residue of an $\alpha,\beta$-monoolefinically unsaturated acyl halide. Except that it must be borne in mind that the reaction produces a strong acid (typically HCl when an acyl chloride is used) which immediately inhibits the reaction. As a result, carrying out the reaction to obtain more than a 50% yield is a problem.

Where the reactants are poorly soluble in commonly available organic solvents, phase transfer catalysis ("PTC") has been used, both in polymer modification (see J. M. J. Frechet, Polym. Prepr., 23(1), 139 (1982); and, Y. Imai, J. Macromol. Sci. -Chem., A15, 833 (1981)), and in polymer synthesis (see L. J. Mathias, J. Macromol. Sci. -Chem., A15, 853 (1981); and, F. L. Cook and R. W. Brooker, Polym. Prepr., 23(1), 149 (1982)). In nucleophilic displacement step-growth polymerizations in which PTC syntheses have been used, not only can the need for anhydrous aprotic solvents be obviated but there are also several other advantages. The reaction is very fast, quickly reaching high MW and 100% yield. The polymer weight is relatively independent of the ratio between the nucleophilic and electrophilic reactants. Most importantly, the organic-soluble polymer obtained almost always contains an electrophilic species as a chain end, independent of the reaction yield and reactant ratio.

I have found that this approach, namely a phase transfer catalyzed (PTC) reaction, is surprisingly effective where an alkali metal phenolate of a mono-OH-terminated PAPE does not react easily with a m-or p-haloalkyl vinylaromatic reactant such as chloromethylstyrene ("ClMS"), or, haloalkyl olefinically unsaturated reactant, each of which are referred to herein as "HAR".

Further, it must be kept in mind that a reaction with ClMS at relatively higher temperature than room temperature will result in polymerization of the ClMS and the reaction is therefore unsuitable. Prepolymerization is also a problem, though to a lesser extent, with an esterification reaction with a haloacyl reactant. Even when carried out below about 20° C., the reaction mixture contains a low molar concentration of phenol end groups which are less reactive than the nonsolvated onium phenolate and consequently inhibits the reaction. As a result, carrying out this reaction to obtain more than 50% yield is a problem.

Still further, an alkali metal salt of a phenol-terminated polysulfone lacks stability under conventional PTC reaction conditions, particularly using a minor mol equiv amount of PTC, and hydrolyzes. This invention provides a solution to the problem.

None of the prior art teachings relate to a OH-terminated aromatic polyether sulfone (APS) or a polyether ketone (APK), or a polyphenylene oxide (PPO) macromer which is etherified with a vinylbenzyl ("VB") group (also referred to as 'monostyrenated'); nor do the teachings relate to such a macromer which is esterified with an ester group such as a (meth)acrylyl group. The term "(meth)acrylyl" is used herein to denote either acrylyl and/or methacrylyl moieties.

In Japanese patent No. 108480, there is disclosed how to make a graft copolymer by polymerizing a vinyl monomer in the presence of an APS difunctionalized with terminal double bonds. This is done by reacting the di-OH-terminated APS with an excess of methacryloyl chloride so that both ends of the APS are provided with methacrylyl chain ends. When reacted with the vinyl monomer, the structure of the resulting copolymer has a backbone of the polymerized vinyl monomer and methacrylyl chain ends from which backbone APS chains are pendant, the number of such chains depending upon the relative molar proportions of vinyl monomer and APS which are copolymerized. Each of the pendant APS chains has a terminal methacrylyl group which of course may react with additional vinyl monomer or another methacrylyl chain end forming a cross-linked network.

It will be clear that with the addition of an excess of methacryloyl chloride, there can be no APS chains with only a single methacrylyl chain end. As is well known, the reaction of methacryloyl chloride with a phenolic OH group is essentially quantitative amounting to a titration. Moreover, if even a trace quantity of APS chain ends were OH-terminated, they would function as an inhibitor for the subsequent polymerization with the vinyl monomer. Stated differently, the Japan reference was interested in functionalizing both chain ends directly with methacryloyl chloride and used an excess to make sure this occured. Thus the subsequent graft copolymer structure which was formed by polymerization with a vinyl monomer, resulted in pendant APS chains with methacrylyl chain ends which were free to react under the conditions of copolymerization.

I know of no instance where a sodium or potassium or other alkali metal salt of a APS, APK or PP oligomer has been prepared which is substantially insoluble in commonly available organic solvents at room temperature, yet has been used in a PTC reaction to esterify the oligomer with an ester chain end; or, a modified Williamson etherification to etherify the oligomer with a VB head ("styrene-type") chain end; either of which PTC reactions results in substantially 100% yield of the vinyl-functionalized macromer.

The process of my invention provides for such a reaction with a Pape oligomer. Such monofunctionalized macromers I have made are disclosed in *Polymer Bulletin*, Springer Verlag 1983, in two articles titled "Comb-Like Polymers and Graft Copolymers from Macromers" 1. Synthesis and Characterization of Methacrylate and Styrene Macromers of Aromatic Polyether Sulfones; and, 2. Synthesis, Characterization and Homopolymerization of a Styrene Macromer of Poly(2,6-Dimethyl-1,4-Phenylene Oxide); 10, 215–222, and 10, 397–403, respectively, by Virgil Percec, Peter L. Rinaldi and Brian C. Auman, the disclosures of which articles are incorporated by reference thereto as if fully set forth herein. More specifically, VB-terminated and (meth)acrylate-terminated macromers may be further polymerized or copolymerized rapidly to yield comb-like polymers or graft copolymers.

The monofunctionalized APS, APK and PPO macromers may also be used as intermediates for the synthesis of compounds with mono-ethynyl unsaturation. For example, the mono(styrenated) macromer may be converted to an $\alpha$-(ethynylbenzyl) polysulfone or polyketone, either of which has a terminal triple bond. This macromer is a convenient starting material for the preparation of high temperature homopolymers and graft copolymers which cure thermally without generating volatiles.

SUMMARY OF THE INVENTION

It has been discovered that comb-like polymers and graft copolymers may be prepared which contain high $T_g$ grafts in the form of polyarylene polyether pendant chains having no terminal double bonds, which grafts, and their precursor monofunctionalized monomers, have never been prepared by known methods. These polymers and copolymers allow the development of novel extreme service materials from macromers in which the vinyl-functionalized end group and the remaining body portion of the macromer would otherwise be expected not to be compatible with other vinyl-functional monomers used to form the comb-like or graft copolymers. By compatible polymers I refer to polymers which form a single phase under processing conditions.

In one specific embodiment, it has been discovered that a soluble PAPE oligomer having from 2 to about 100 repeating units, in which oligomer each repeating unit is connected to another through an O atom, may be esterified so as to yield a monofunctionalized macromer with vinyl unsaturation at a single chain end, by a reaction in solution ("solution reaction") with a solvent for the reactants in the presence of base, at ambient pressure and a temperature below that at which the functionalized ends will be substantially linked.

In another specific embodiment it has also been discovered that an insoluble monophenolate of the PAPE oligomer can only be monofunctionalized in a PTC reaction described in detail hereafter.

It has further been discovered that a monohydric monomer may be converted to a monophenolate salt, preferably in situ, which salt in the presence of an effective amount of PTC sufficient to solubilize the salt in the organic phase and essentially to negate hydrolysis of the oligomer, may be (a) esterified with the HAR, or, (b) be etherified with a haloalkyl-$\alpha,\beta$-olefinically unsaturated reactant "HAR". For example, an aromatic polyether sulfone (APS) oligomer may either be esterified or etherified by means of a PTC reaction.

It is therefore also a general object of this invention to provide a PTC condensation reaction which is a simple, highly efficient modified Williamson etherification yielding macromers which can be used to prepare comb-like polymers and graft copolymers containing high $T_g$ grafts or tines of the comb-like polymer; and, no end of any tine or pendant chain has a terminal double bond.

The macromer of this invention produced as a mass free from difunctionalized macromer, is represented as follows:

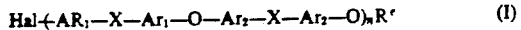  (I)

wherein $R^r$ represents

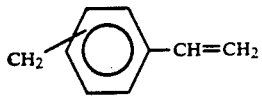

or

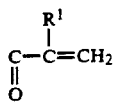

$R^1$ represents $CH_3$ or H; Hal represents halogen;

X represents $SO_2$, CO or O, and may be the same or different; n is an integer from 1 to about 100;

$Ar_1$ and $Ar_2$ represent 1,4-phenylene, 1,4-naphthylene, or 2,6-dimethyl phenylene;

except that when $Ar_1$ is the same as $Ar_2$ and each represents 2,6-dimethyl phenylene, X can only be oxygen, O.

It has still further been discovered that a monostyrenated APS or PPO macromer, obtained as described hereinabove free of distyrenated chains, may be converted to an α-(ethynylbenzyl)-terminated macromer in two main steps. Each chain thus maintains a single reactive chain end with ethynyl functionality.

It is therefore yet another specific object of this invention to convert a mono-styrenated PAPE macromer into an α-(ethynylbenzyl)-terminated macromer in a process comprising, brominating the vinyl end group of the vinylbenzyl residue, followed by dehydrobromination in the presence of potassium-tert-butoxide ("K-t-Bu").

The macromer with ethynyl functionality is represented as follows:

reactive macromer. A reactive macromer may also be used to form crosslinked copolymers. For example, a propylene fumarate polyester is cured with a monostyrenated APS to give a copolymer crosslinked by short blocks of reactive macromer. Since both chain ends of the macromer derived from a terminally halogenated monohalo-APS or monohalo-PPO are easily characterized by $^1$H-and $^{13}$C-NMR spectroscopy, the monofunctionalization of a PAPE can be followed.

Accordingly, a PAPE oligomer in which the —OH of the phenyl ("Ph") group is essentially unreactive with a leaving group on a vinyl-containing reactant, can be converted in solution to an acyl-terminated reactive macromer, typically a PPO, or APS such as a (meth)acrylyl-terminated polysulfone or polyketone macromer which is polymerizable to yield comb-like polymers and graft copolymers.

Further, an oligomer is converted to a salt, preferably in situ, which in the presence of an effective amount of phase transfer catalyst ("PTC") sufficient to solubilize the salt in the organic phase and to essentially negate hydrolysis of the oligomer, may either (a) be etherified (modified Williamson etherification) with a haloalkyl-α,β-olefinically unsaturated reactant, or (b) be esterified with an α,β-unsaturated haloacyl reactant, each of which reactants are referred to herein as "HAR". Thus, a PTC condensation reaction has been found to be a simple, highly efficient method for the synthesis of macromers containing a vinylbenzylic ("VB") chain end.

The synthesis of a PAPE macromer in a solution reaction comprises reacting a mono-OH-terminated PAPE oligomer with an HAR such as (meth)acryloyl chloride (MC) in a solution of a halogenated hydrocarbon and in the presence of 4-N,N-dimethylaminopyridine (DMAP), triethylamine (TEA), or other organic base, which is present in an amount sufficient to catalyze the esterification and also to effectively neutralize the HCl formed during the reaction so as to permit substantially quantitative esterification.

The PTC synthesis of a reactive macromer comprises, either (a) etherifying an alkali metal salt of the PAPE, or (b) esterifying the salt, with a HAR, essentially quantitatively, in the presence of a solubilizing amount of a PTC to yield a functional head consisting of the residue of the HAR at one end of the macromer. The reactive macromer may then be reacted with conventional small monomers having vinyl unsaturation

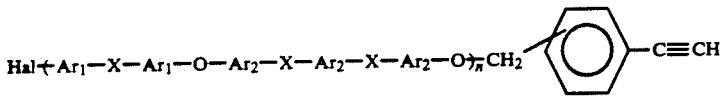 (II)

DETAILED DESCRIPTION OF PREFERRED EMBODIMENTS

In a preferred embodiment, this invention is directed to a new class of reactive monofunctionalized PAPE macromers which undergo thermal, radical, anionic, cationic or coordinative polymerizations and copolymerizations.

The physical properties of the reactive macromers are investigated through novel comb-like polymers formed by their homopolymerization; and, novel graft copolymers are formed by copolymerization of the reactive macromer with a polymerizable monomer having vinyl unsaturation, illustrated by a graft copolymer of from 10 to 30 mol equivs of butadiene to 1 mol of and electrophilic groups, in a known manner.

More specifically, a relatively low $\overline{M}n$ PAPE macromer containing a styrene-type or methacrylyl residue at one end, is prepared by either (a) a PTC reaction of an alkali metal salt of the PAPE oligomer with an HAR, which reaction yields the macromer having a mol wt $\overline{M}n$ in the range from 1000 to about 10,000, or, (b) a solution reaction with an α,β-monoolefinically unsaturated acyl chloride, either of which reactions (a) or (b) are carried out in the presence of a major molar amount, that is, more than 50 mole percent (mol %) of a PTC. The terms "mol %" and "mol equiv" are used herein based on each mole of —OH in the oligomer, unless otherwise specified.

In a specific illustration this invention provides a styryl-terminated macromer of polysulfone, polyketone, or copolymer of sulfone-ketone having from 2 to about 20 repeating units; and, in another, a metharcylyl-terminated macromer of polysulfone, or polyketone, or a copolymer of sulfone-ketone, having from 2 to about 20 repeating units.

The specific monomers from which the OH-terminated macromer of homopolymer, or of copolymer, is prepared, then functionalized, are the following:

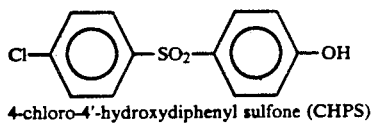

4-chloro-4'-hydroxydiphenyl sulfone (CHPS) (III)

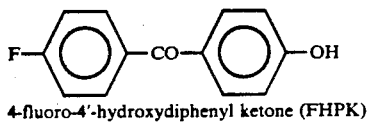

4-fluoro-4'-hydroxydiphenyl ketone (FHPK) (IV)

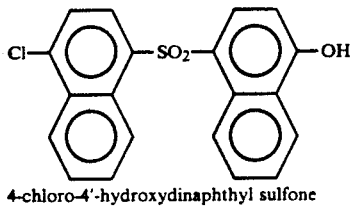

4-chloro-4'-hydroxydinaphthyl sulfone (V)

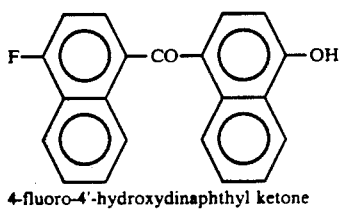

4-fluoro-4'-hydroxydinaphthyl ketone (VI)

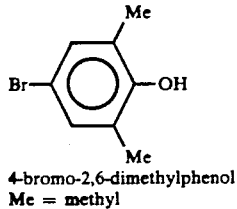

4-bromo-2,6-dimethylphenol
Me = methyl (VII)

In the particular instance where an OH-terminated oligomer of (III) is to be monostyrenated, the styrenated macromer is represented by the structure:

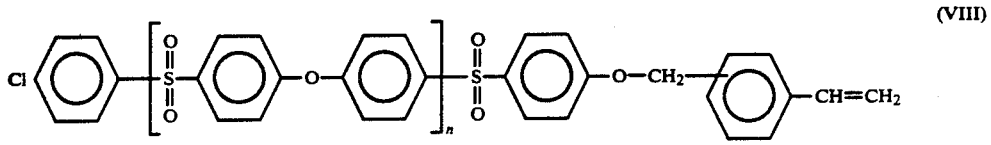
(VIII)

In the particular case where the PAPE oligomer to be monostyrenated is PPO, the monostyrenated macromer is represented by the structure:

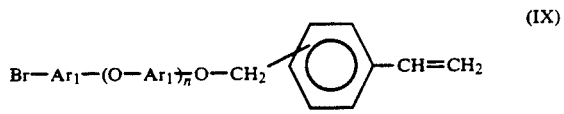
(IX)

wherein $Ar_1$ is 2,6-dimethyl phenylene.

The PAPE macromer formed by the process of my invention may be used for a host of different purposes, depending upon whether they are homopolymers or copolymers, their molecular weight, $T_g$, and related chemical and physical properties. Relatively high mol wt macromers in the range from about $\overline{M}n$ 5000 to about 10,000 may be used with a conventional free radical initiator or simply thermally polymerized while it is being extruded into sheet, or injection molded into shaped articles such as pump housings and the like. Another use for the PAPE macromers is for blending with polymers to improve the processability of the blend and to increase the $T_g$ of the finished product because of the generally high $T_g$ in the range from 100°-200° C. contributed by the PAPE after it is cured. Most importantly, a wide variety of novel graft copolymers may be prepared which are thermoplastic elastomers with high $T_g$ grafts. These grafts may be grafted, upon curing, to a backbone formed of linked $R^e$ units which, if polymerized without the grafts would produce a separate phase. Stated differently, even if separate polymers of the graft and the $R^e$ would, when blended, produce separate phases, the polymacromer formed with $R^e$ in the backbone and the remaining portion of the macromer in the grafts, produces a single phase.

An important advantage of a polysulfone oligomer is its insolubility in chloroform ($CHCl_3$). After the —OH end group is functionalized the macromer becomes soluble in $CHCl_3$. Most polysulfones and polyketones are soluble in dichloromethane ($CH_2Cl_2$) but a Na or K salt of the OH-terminated oligomer can be easily precipitated from the $CH_2Cl_2$. These physical characteristics are useful for purification of either the oligomers or their derivatives.

In a first embodiment, the OH-terminated oligomer is esterified with an $\alpha,\beta$-monoolefinically unsaturated acyl halide having from 3 to about 18 carbon atoms, but most preferably (meth)acryloyl chloride, by an 'in solution' reaction in the presence of an organic base and, optionally, additional means for 'tying-up' HCl as it is formed, for example, by reaction with an amine base.

In a second embodiment, the OH-terminated oligomer is etherified in the presence of a PTC. This reaction may be used to provide a styrylalkenyl, alkenyl, or alkoxyvinyl ether end group, any of which groups may have up to about 18 carbon atoms.

The 'in solution' Reaction

A solution of a PAPE oligomer in a halogenated hydrocarbon solvent is reacted with a HAR also in solution, to which is added sufficient amine base to catalyze the esterification of the PAPE and substantially neutralize the halogen acid formed during the reaction. The reaction commences at ice-bath temperature and is preferably completed at room temperature. The reaction mixture is washed with dilute mineral acid, preferably HCl, then water. The washed reaction mixture is dried over $CaCl_2$ or the like, and the monofunctionalized PAPE macromer formed is precipitated with a lower alkanol, preferably methanol.

The PTC Reaction

A OH-terminated PAPE oligomer is converted to an alkali metal salt of the PAPE, preferably the potassium or sodium salt by reaction with 4N KOH solution in aqueous methanol and methanolic 4-chloro-4'-hydroxydiphenyl sulfone as disclosed by Attwood et al, supra. The potassium salt was vacuum dried at 120° C. before use.

The salt, and a HAR which has a terminal electrophilic haloalkyl group at one end, and a vinyl group at the other, are reacted under PTC reaction conditions which essentially negate hydrolysis of the HAR and increases the reactivity of the phenolate chain end. This is because the onium phenolate is dissolved in a non-polar solvent which does not solvate the onium anions.

A conventional Williamson etherification takes place in the organic phase which is often provided by a reactant, or typically in a solvent such as THF. It may also take place in a far less common solvent such as DMSO which is of particular interest because a preferred APS for my invention is the Ph-terminated APS. But a conventional Williamson etherification is inapposite in the context of the physical properties of the reactants, as the phenolate is insoluble in the organic phase without a solubilizing amount of a PTC.

The process for forming a monofunctionalized macromonomer (MPAPE) derived from a substantially linear polymerizable OH-terminated PAPE oligomer, comprises (a) reacting a salt of the PAPE oligomer having a molecular weight $\overline{M}n$ in the range from about 1000 to about 10,000, with a haloalkyl reactant ("HAR") essentially quantitatively in the presence of a phase transfer catalyst ("PTC") distributed between an organic phase and an aqueous phase in an amount sufficient to solubilize said salt and substantially negate hydrolysis of the HAR, so as to yield a functional head consisting of the residue of the HAR at one end of the PAPE oligomer; (b) precipitating the MPAPE macromonomer from the organic phase; and, (c) recovering the MPAPE macromonomer.

It is essential that the MPAPE be prepared by reaction of the MPAPE with the HAR in the presence of a solubilizing amount of a PTC under aqueous alkaline conditions. By a "solubilizing amount" of PTC I refer to an amount sufficient to solubilize the alkali metal salt of the PAPE oligomer formed in the aqueous phase. By "aqueous alkaline conditions" I refer to a large excess of an aqueous solution of an alkali metal hydroxide containing from about 15% to about 75% by weight (% by wt), and preferably from about 30% to about 50% by wt of alkali metal hydroxide. Preferred alkali metal hydroxides are those of sodium and potassium. By "large excess" I refer to an excess based on the number of moles of OH groups originally present in the APS, preferably from about a two-fold (2 times) to a twenty-fold (20 times) excess.

Unlike most PTC reactions, where the reaction proceeds in the presence of a minor molar amount from about 1 mole percent (mol %) to about 50 mol % based on the moles of one of the reactants, under such conditions there quite unexpectedly is only a slow reaction which adds the HAR to the —OH end of the PAPE oligomer. However, when the concentration of PTC is increased to a major molar amount, that is more than 50 mol %, the reaction proceeds more quickly. It is preferred to use an equimolar amount of PTC for an economical reaction rate.

The PTC process may be carried out in the precipitation mode by (a) precipitating the salt from an organic solvent for said PAPE oligomer by reaction with an excess, based on the moles of —OH groups originally present in said PAPE oligomer, of an aqueous solution of an alkali metal hydroxide; (b) solubilizing the salt by adding a major molar amount of the PTC, based on the mole equivalents (mol equivs) of —OH groups originally present in the PAPE oligomer; and, (c) reacting solubilized salt with the HAR present in at least an equimolar amount, based on the moles of —OH groups originally present in the PAPE macromer.

The PTC process may be carried out in the in situ mode by (a) forming the salt in situ by contacting the PAPE oligomer with the PTC dissolved in an organic solvent for the PAPE oligomer and PTC; thereafter (b) adding at least one molar equivalent of the HAR for each mole of —OH or —SH groups originally present in the PAPE oligomer; then (c) adding an excess, based on the moles of —OH groups present, of an aqueous solution of an alkali metal hydroxide.

By PTC, I refer to onium salts, macrocyclic polyethers (crown ethers), macrobicyclic polyethers (cryptands), and the like, most preferred being the onium salts of a Group VA element of the Periodic Table having certain structural limitations. The preferred salts have the formula $R_nY^+X^-$ where Y is chosen from N, P and S; R represents either different or identical monovalent organic radicals bonded to Y by covalent linkages; $X^-$ is a counterion; and n is an integer which may be 3 or 4. When Y is pentavalent, for example P or N, then N=4, and when Y is tetravalent, for example S, then n=3. In an analogous manner, onium salts having certain multivalent organic substituents may be useful in this invention. Examples include multivalent organic radicals that include Y in a ring, and those that are bonded to more than one Y.

More preferred onium salts for use in this invention have the formula $(R_aR_bR_cR_dY^+)X^-$ wherein Y is N or P, and $R_a$–$R_d$ are monovalent hydrocarbon radicals preferably selected from the group consisting of alkyl, alkenyl, aryl, alkaryl, aralkyl, and cycloalkyl moieties or radicals, optionally substituted with suitable heteroatom-containing functional groups. The total number of carbon atoms in $R_a$, $R_b$, $R_c$, and $R_d$ if the salt is quaternary, should be at least 10 and is preferably in the range from about 15 to 40. No theoretical maximum number of carbon atoms for inclusion in the onium salts exists, although in general, about 70 carbon atoms represents the upper limit imposed by practical limitations. Since the liquid phases involved are aqueous and organic, the number of carbon atoms and structure of the onium salts are usually selected to impart to the salt the requisite solubility in the organic phase. The onium salt itself is nonreactive to all materials in the reaction mixture except the reactants themselves, and the addition of the HAR to the polysulfone or polyketone takes place in the organic phase.

Most preferred onium salts have Y=N, and the hydrocarbon radicals where $R_a$ is $C_2H_5$, and $R_b$, $R_c$, and $R_d$ are each selected from the group consisting of n-$C_4H_9$; n-$C_5H_{11}$; mixed $C_5H_{11}$; n-$C_6H_{13}$; mixed $C_6H_{13}$; $C_6H_5$; $C_6H_5CH_2$; n-$C_8H_{17}$; n-$C_{12}H_{25}$; n-$C_{18}H_{37}$; mixed $C_8$-$C_{10}$ alkyl; and the like. However, $R_a$ may also be selected from n-$C_3H_7$ and n-$C_4H_9$.

Various counterions may be used, including $Cl^-$, $Br^-$, $I^-$, $F^-$, $HSO_4^-$ and the like. Most preferred is $HSO_4^-$. A commercially available and highly effective onium salt PTC is tetrabutylammonium hydrogen sulfate ("TBAH").

Common HAR monomers are haloalkyl vinyl ethers having from 3 to about 20 carbon atoms, m- or p-haloalkyl vinylaromatic compounds having from 9 to about 30 carbon atoms, terminally monohalogenated $\alpha,\beta$-unsaturated olefins having from 3 to about 18 carbon atoms, a vinyl halide terminated alkane having from 3 to about 18 carbon atoms, particularly allyl chloride, and the like. The PAPE may also be reacted with an HAR macromer having a $\overline{M}n$ less than about 10,000 and preferably less than about 5,000, a terminal haloalkyl group, or a haloacyl group, and a vinyl group at the other end.

Though VB end groups are most preferred, any HAR with a comparably reactive halogen atom at one end and a vinyl group at the other, will provide excellent reaction rates and yields. Similarly, though methacryloyl chloride is the most preferred HAR for esterification, numerous available terminally monohalogenated $\alpha,\beta$-unsaturated olefins may be used, most preferably if they include an allylic halide group. For example, 1-chloro-2-hexene is an HAR with desirable allylic halide characteristics. Also useful, but providing a slower reaction rate, is 6-chloro-1-hexene, which is not an allylic halide.

The reaction temperature and pressure conditions for monofunctionalizing the PAPE oligomer with vinyl end groups, and particularly styryl-type end groups, are not critical, most reactions occuring at ambient (atmospheric) pressure and above ice-bath temperature (0° C.) but below a temperature at which the PAPE formed will prematurely polymerize, or above that which will deleteriously affect the structure of the macromer. The pressure may range from about 1 to about 20 atms, and the precise temperature at which a particular reaction will proceed most favorably will depend upon the particular HAR chosen, the mol wt of the PAPE oligomer, and the solvent medium, inter alia, as one might expect, and may be determined with a little trial and error, as one skilled in the art would expect to do. Most preferred for forming the PAPE with styryl, alkenyl, or dialkoxyvinyl ether end groups is a temperature in the range from about 10° C. to about 150° C.

The vinyl unsaturation in $R^e$ of the MPAPE macromer (I) formed hereinabove may be converted to ethynyl unsaturation, so that the structure of the ethynyl-terminated macromer is represented by the structure (II) hereinabove.

The temperature and pressure reaction conditions for forming a macromer (II) is not critical, but in the general range conventionally used for bromination and, thereafter, dehydrobromination of the MPAPE. Both bromination and dehydrobromination reactions are found to proceed quickly at ambient pressure and a temperature in the range from about 10° C. to about 100° C., again depending upon the solvent used, the particular PAPE oligomer used, especially with respect to its mol wt. Most preferred organic solvents for ethynylation of the MPAPE are DMSO and THF.

The main criterion for choice of the solvent is its insolubility in the aqueous alkaline phase, because the solubilization of the PAPE-salt with the PTC (say, TBAH) occurs quite readily in most organic phases, whether the PAPE-salt is precipitated, or whether it is formed in situ and is solubilized without actually being precipitated. Solvents such as DMSO and THF which are soluble in water, but are essentially insoluble in this aqueous alkaline phase, may be used. To tailor a MPAPE to conform with theoretical expectations, it is most preferred to use an inert, that is non-reactive, solvent such as dichlorobenzene or other inert halogenated aromatic, aliphatic or cycloaliphatic liquids.

Precipitation of the PAPE-salt will occur when the excess aqueous alkali is added to a solution of the PAPE-salt in the organic solvent. The salt so formed is then solubilized by the PTC and is taken up by the organic phase. When the HAR is added, reaction occurs and the PAPE is monofunctionalized. This first mode of carrying out the difunctionalization is referred to as the "precipitation mode".

Precipitation of the PAPE-salt is avoided when the PTC is dissolved in the organic phase and added to the PAPE, and the HAR then added. Added last, is the aqueous alkali so that the PAPE-salt is formed in situ and the desired monofunctionalization results without actual precipitation of the PAPE-salt. This second mode of carrying out the monofunctionalization is referred to as the "in situ mode". The reaction mixture is always homogeneous. The phenolate of the PAPE oligomer is not in contact with a solvent which might react with the terminal —OH group in the absence of the HAR. As will be evident, such a reaction will preclude the effective monofunctionalization sought.

EXAMPLE 1

Synthesis of Methylmethacrylate-terminated Polysulfone (PS-MM)

A solution of methacryloyl chloride (0.9 ml, 0.009 mol) in 3 ml of $CH_2Cl_2$ was added dropwise to a stirred $CH_2Cl_2$ solution (30 ml) of an aromatic polyether sulfone containing one phenol end group (Ph-PS) (0.0029 mol of —OH) having a $\overline{M}n$ of about 2085, 4-N,N-dimethylaminopyridine (DMAP) (0.35 g, 0.0029 mol), and triethylamine (TEA) (0.8 ml, 0.006 mol) cooled in ice-water. After stirring one hr at the ice-water temperature and 5 hr at room temperature, the reaction mixture was washed with dilute HCl solution, then water. The washed solution was dried over $CaCl_2$ and the product was precipitated with methanol.

The Ph-PS was prepared by condensation polymerization of the potassium salt of 4-chloro-4'-hydroxydiphenyl sulfone (CHPS) prepared by the hydrolysis of 4,4'-dichlorodiphenyl sulfone (DCPS) with 50% aqueous KOH (2 moles of KOH for one mole of DCPS) in DMSO according to a literature method. The product (CHPS) was recrystallized from a methanol/toluene (50/50, V/V) mixture and then from toluene (mp 147.5°–149° C.). It is essential that the mono-OH-terminated monomer be the starting material.

The structure of the PS-MM is corroborated by spectroscopic analysis and is represented as follows:

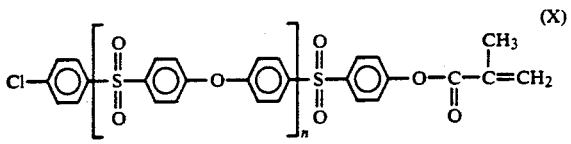

EXAMPLE 2

Synthesis of Styrenated Polysulfone (PS-St)

A 50% aqueous solution of NaOH (7 ml) was added to a stirred solution of Ph-PS (6 g, 0.0029 mol of —OH and $\overline{M}_n$ about 2085) in 40 ml $CH_2Cl_2$ or DMSO at room temperature. The sodium salt of Ph-PS precipitated immediately. After the addition of tetrabutylammonium hydrogen sulfate (TBAH) (0.99 g, 0.0029 mol) the reaction mixture became homogeneous once more. The addition of chloromethylstyrene (ClMS) (1.5 m ml, 0.015 mol) created a dark blue colored reaction mixture. After stirring 1 hr at room temperature, the color of the reaction mixture turned to light green and shortly thereafter to yellow. NMR analysis indicated complete reaction at this point, but usually the reaction was continued for one more hr. The reaction mixture was then diluted with $CH_2Cl_2$, washed twice with water, dried over $CaCl_2$ and the product was precipitated with methanol. A final purification was carried out by precipitating the product from $CHCl_3$ solution with methanol.

The structure of the product was corroborated by 200 MHz $^1H$- and 50 MHz $^{13}C$-NMR spectra which were recorded on a Varian 200 spectrometer in different solvents (DMSOd$_6$, CDCl$_3$, CH$_2$Cl$_2$). Chemical shifts were obtained relative to internal TMS. IR spectra of polymer films on KBr plates were recorded on a Digilab FTIR spectrometer. The structure is represented by structure VIII hereinabove.

EXAMPLE 3

In a manner analogous to that described hereinabove, the potassium salt of 4-fluoro-4'-hydroxydiphenyl ketone (CHPK), (IV hereinabove), was prepared and the OH-terminated polyketone was prepared, then styrenated, to yield a 4-fluoro-4'-(vinyl benzyl)-polyketone.

EXAMPLE 4

Synthesis of Styrenated Copolymer of CHPS and FHPK:

A random copolymer of CHPS (III) and FHPK (IV) is formed by condensation polymerization of the potassium salts of each in sulfolane (40% phenoxide) under nitrogen at elevated temperature up to about 230° C., in a manner analogous with the formation of OH-terminated PS. The random copolymer was then styrenated in a manner analogous to that described in example 2 hereinabove. The structure of the copolymer formed is that of the general structure (I) in which:

$Ar_1 = Ar_2 = 1,4$-phenylene;
$X = SO_2$ or CO;
$R^e$ is vinylbenzyl;
Hal = Cl or F depending upon whether the first unit is sulfone or ketone; and,
the mol ratio of $SO_2$ to CO in the diphenyl sulfone and diphenyl ketone in the chains may range from 2:98 to 98:2. In a specific example, the ratio is 50:50.

EXAMPLE 5

Synthesis of Methylmethacrylate-terminated Copolymer of CHPS and FHPK:

A random copolymer of CHPS (III) and FHPK (IV) is formed by condensation polymerization in a manner analogous with the formation of OH-terminated PS. Methacryloyl chloride was added dropwise to a stirred $CH_2Cl_2$ solution of the phenol-terminated copolymer in a manner analogous to that described in example 1 hereinabove. The structure of the copolymer formed is that of the general structure (I) in which:

$Ar_1 = Ar_2 = 1,4$-phenylene;
$X = SO_2$ or CO;
$R^e$ is methacryloyl;
Hal = Cl or F depending upon whether the first unit is sulfone or ketone; and,
the mol ratio of $SO_2$ to CO in the diphenyl sulfone and diphenyl ketone in the chains may range from 2:98 to 98:2. In a specific example, the ratio is 50:50.

EXAMPLE 6

Synthesis of Styrenated Copolymer of CHPS and 4-Chloro-4'-Hydroxydinaphthyl Sulfone A random copolymer of CHPS (III) and 4-chloro-4'-hydroxydinaphthyl sulfone (IV) is formed by condensation polymerization of the potassium salts of each in sulfolane (40% phenoxide) under nitrogen at elevated temperature up to about 230° C., in a manner analogous with the formation of OH-terminated PS. The random copolymer was then styrenated in a manner analogous to that described in example 2 hereinabove. The structure of the copolymer formed is that of the general structure (I) in which:

$Ar_1 = 1,4$-phenylene;
$Ar_2 = 1,4$-naphthylene;
$X = SO_2$;
$R^e$ is vinylbenzyl;
Hal = Cl; and,
the mol ratio of dinapthyl sulfone to diphenyl sulfone units in the chains may range from 2:98 to 98:2. In a specific example, the ratio is 50:50.

EXAMPLE 7

Synthesis of Styrenated Copolymer of FHPK and 4-Fluoro-4'-Hydroxydinaphthyl Ketone:

A random copolymer of FHPK (IV) and 4-fluoro-4'-hydroxydinaphthyl ketone (VI) is formed by condensation polymerization of the potassium salts of each in sulfolane (40% phenoxide) under nitrogen at elevated temperature up to about 230° C., in a manner analogous with the formation of OH-terminated PS. The random copolymer was then styrenated in a manner analogous to that described in example 2 hereinabove. The structure of the copolymer formed is that of the general structure (I) in which:

$Ar_1 = 1,4$-phenylene;
$Ar_2 = 1,4$-naphthylene;
$X = CO$;
$R^e$ is vinylbenzyl;
Hal = F; and,
the mol ratio of dinapthyl ketone to diphenyl ketone units in the chains may range from 2:98 to 98:2. In a specific example, the ratio is 50:50.

EXAMPLE 8

Synthesis of Styrenated Copolymer of 4-Chloro-4'-Hydroxydinaphthyl Sulfone (V) and 4-Fluoro-4'-Hydroxydinaphthyl Ketone (VI)

A random copolymer of (V) and (VI) is formed by condensation polymerization of the potassium salts of each in sulfolane (40% phenoxide) under nitrogen at elevated temperature up to about 230° C., in a manner analogous with the formation of OH-terminated PS. The random copolymer was then styrenated in a manner analogous to that described in example 2 hereinabove. The structure of the copolymer formed is that of the general structure (I) in which:

$Ar_1 = Ar_2 = 1,4$-naphthylene;
$X = CO$ or $SO_2$;
$R^e$ is vinylbenzyl;
$Hal = Cl$ or $F$; and,
the mol ratio of dinapthyl ketone to dinaphthyl sulfone units in the chains may range from 2:98 to 98:2. In a specific example, the ratio is 50:50.

In a manner analogous to that described hereinabove, other homopolymers and copolymers of the foregoing monomers may be made and functionalized either with a vinylbenzyl end group, of a (meth)acrylyl end group. It will be appreciated that the properties of the OH-terminated polymers will vary depending upon the groups in the repeating unit, and upon the mol ratio of each group in the polymer. These properties are generally carried over into the functionalized chains which can then be polymerized with a olefinically unsaturated monomer of choice.

EXAMPLE 9

Synthesis of Styrenated Poly(phenylene oxide) (PPO-St)

Step 1: Preparation of poly(2,6-dimethyl-1,4-phenylene oxide) (PPO-OH):

PPO-OH was prepared by adding a solution of KOH (13.2 g in 1.15 l of water) and lead dioxide (0.565 g, 1 mole %) to a solution of 47.3 g of 2,6-dimethyl-4-bromophenol in 1.15 of benzene. The mixture was stirred for 44 hr at room temperature. The benzene layer was separated, washed with water until it became colorless and concentrated to 200 ml. The polymer was precipitated with methanol. A second precipitation with methanol from benzene solution yielded 22.4 g (78%) of PPO-OH with $\overline{M}n = 3973$ (determined by 200 MHz $^1$H-NMR).

Step 2: Preparation of PPO-St.

A 50% aqueous solution of NaOH (4 ml) was added to a stirred solution of PPO-OH (4 g, 0.0012 moles) in 40 ml of benzene at room temperature, followed by addition of 0.4 g (0.0012 moles) TBAH and 0.9 g (0.006 moles) ClMS. The addition of ClMS created a dark green colored reaction mixture. After stirring 2 hr at room temperature, the color of the reaction mixture turned to dark brown and shortly thereafter to light brown. NMR analysis indicated complete reaction at this point, but usually the reaction is continued for one more hr. The reaction mixture was then diluted with benzene, and washed with water. The macromer was precipitated with methanol. The final purification was carried out by precipitation of the product from benzene solution with methanol. The filtered macromer was dried to vacuum at room temperature.

Polymerization

The polymerization of PPO-St was carried out in toluene solution in the presence of AIBN in sealed glass tubes under argon. After the required reaction time, the reaction mixture was diluted with CHCl$_3$ and the polymacromer was precipitated with methanol. The conversion of the macromer to polymacromer was determined from the area under the GPC trace of the reacted and unreacted material.

In one specific example, 0.2 g of PPO-St in 0.5 ml of toluene are polymerized with 0.0018 g AIBN at 60° C. The conversion after about 24 hr was 46%. The reaction may be carried out at any temperature in the range from about room temperature to just below the boiling point of the solvent used, under atmospheric or subatmospheric pressure, and up to about 20 atm, if desired. The conversion obtained is found to be a function of the concentration of the catalyst and PPO-St macromer in the solvent, and the temperature and pressure conditions of reaction over the period of time it is carried out.

EXAMPLE 10

The following procedure illustrates the conversion of the particular PS-St made hereinabove in example 2, to 4-chloro-4'-(ethynylphenyl)polysulfone in two steps:

Step 1: Preparation of 4-chloro-4'-(dibromostyrene)-polysulfone.

In the first step, a stirred solution of the PS-St obtained hereinbefore in CH$_2$Cl$_2$ was titrated at room temperature with a 1M solution of Br$_2$ in CH$_2$Cl$_2$. At the end of the titration a few more drops were added until an orange color persisted. After stirring for 30 min at room temperature, the reaction mixture was precipitated into slightly acidified methanol, filtered, washed with methanol and dried under vacuum at room temperature. The product obtained was confirmed by analysis to be α-(dibromostyrene)polysulfone (PS).

Step 2: Preparation of the 4-chloro-4'-(ethynylphenyl)PS:

In the second step, to a stirred solution of the dibromoPS product obtained hereinabove in DMSO or THF was added a solution of potassium-tert-butoxide ("K-t-Bu") in DMSO or THF. KBr started to precipitate during the early stages of the addition of K-t-Bu solution. Samples were withdrawn periodically and the conversion was monitored by $^1$H-NMR analysis. Usually after 4 hr of reaction, the dehydrobromination was complete both in DMSO as well as in THF. The solution was filtered and polymer is precipitated in acidified methanol, then filtered and dried. To remove all traces of organic impurities, the obtained polymer was dissolved in CH$_2$Cl$_2$, filtered and precipitated again in methanol, and then filtered and dried at room temperature under vacuum.

The sequence of reactions, starting with the CHPS, is given below:

It will readily be evident from the foregoing that the 4-halo-4'-(ethynylphenyl)PS macromers will easily be thermally cured, which is the dominant characteristic of acetylene terminated macromers. What is so useful is that the 4-halo-4'-(ethynylphenyl)PS macromers, like the PS-St and to a lesser extent, the PS-MM macromers, are thermally cured with good speed, but the ethynylphenyl-terminated macromers produce no volatiles at all. If desired, they may also be cured with conventional initiators such as acetyl peroxide, the heavy metal polymerization initiators, and the like, as is well known in the art.

MAIN STEPS IN THE SYNTHESIS OF AROMATIC POLYETHER SULFONES CONTAINING A STYRENE, AND AN ETHYNYLPHENYL CHAIN END

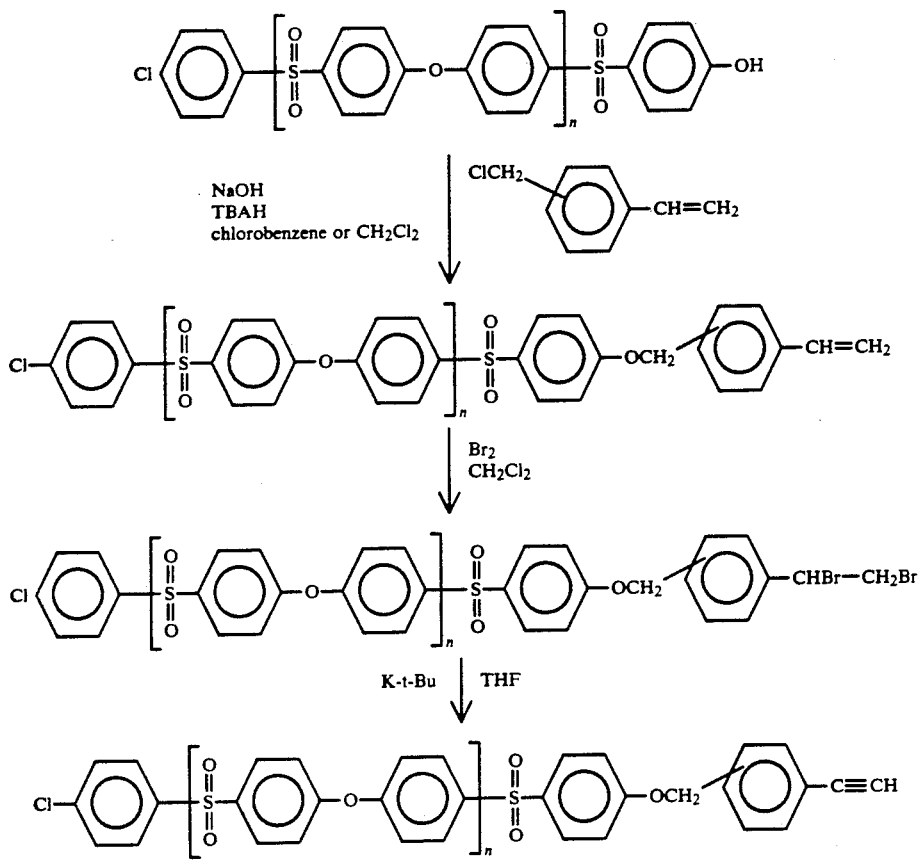

What is claimed is:

1. A mass of monofunctionalized polyarylene polyether macromonomer free from difunctionalized macromonomer, said monofunctionalized polyarylene polyether macromonomer being represented by the formula Hal—(Ar$_1$—X—Ar$_1$—O—Ar$_2$—X—Ar$_2$—O—)$_n$—R$^e$ wherein
R$^e$ represents

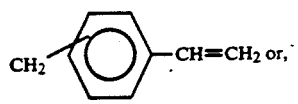

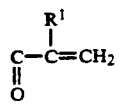

R$^1$ represents CH$_3$ or H;
Hal represents halogen, particularly F, Cl or Br;

X represents SO$_2$, CO or O, and may be the same or different;

n is an integer in the range from 1 to about 100;
Ar$_1$ and Ar$_2$ are selected from the group consisting of 1,4-phenylene, 1,4-naphthylene, and 2,6-dimethylphenylene, and may be the same or different; except that when Ar$_1$ and Ar$_2$ are the same, and each represents 2,6-dimethyl-1,4-phenylene, then X can only be O.

2. The mass of monofunctionalized polyarylene polyether macromonomer of claim 1 wherein Ar$_1$ and Ar$_2$ are the same, each represents 1,4-naphthylene, Hal is Cl, and X is SO$_2$.

3. The mass of monofunctionalized polyarylene polyether macromonomer of claim 1 wherein Ar$_1$ and Ar$_2$ are different, Ar$_1$ represents 1,4-phenylene, Ar$_2$ represents 1,4-naphthylene, and X is SO$_2$.

4. The mass of monofunctionalized polyarylene polyether macromonomer of claim 1 wherein R$^e$ represents

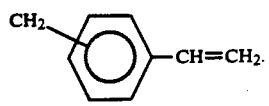

* * * * *